United States Patent [19]

Yasuhara et al.

[11] Patent Number: 4,864,489

[45] Date of Patent: Sep. 5, 1989

[54] FIELD INSTRUMENTATION SYSTEM

[75] Inventors: Takeshi Yasuhara; Eiichi Nabeta, both of Kanagawa, Japan

[73] Assignee: Fuji Electric Co., Ltd., Kanagawa, Japan

[21] Appl. No.: 302,138

[22] Filed: Jan. 27, 1989

Related U.S. Application Data

[63] Continuation of Ser. No. 550,413, Nov. 10, 1983, abandoned.

[30] Foreign Application Priority Data

Nov. 12, 1982 [JP] Japan ............................... 57-199556

[51] Int. Cl.⁴ ......................... G06F 15/46; H04B 9/00

[52] U.S. Cl. ................................... 364/131; 364/138; 455/603; 455/607; 340/825.06; 350/96.16; 370/85.12

[58] Field of Search ............... 364/131, 133, 138, 139; 350/96.15, 96.16; 455/603, 607, 608, 612; 340/825.05, 825.06; 370/1, 88

[56] References Cited

U.S. PATENT DOCUMENTS

| | | | |
|---|---|---|---|
| 4,161,650 | 7/1979 | Caouette et al. | 350/96.16 |
| 4,161,651 | 7/1979 | Sano et al. | 455/612 |
| 4,227,260 | 10/1980 | Vojvodich | 350/96.16 |
| 4,234,969 | 11/1980 | Singh | 350/96.16 |
| 4,276,656 | 6/1981 | Petryk, Jr. | 350/96.16 |
| 4,304,001 | 12/1981 | Cope | 364/138 |
| 4,366,565 | 12/1982 | Herskovitz | 350/96.16 |
| 4,399,563 | 8/1983 | Greenberg | 350/96.16 |
| 4,417,334 | 11/1983 | Gunderson et al. | 370/1 |
| 4,422,180 | 12/1983 | Wendt | 455/612 |
| 4,442,502 | 4/1984 | Friend et al. | 455/607 |
| 4,456,793 | 6/1984 | Baker et al. | 455/607 |
| 4,470,154 | 9/1984 | Yano | 455/612 |
| 4,500,951 | 2/1985 | Eugimoto et al. | 364/133 |
| 4,501,021 | 2/1985 | Weiss | 455/612 |
| 4,531,193 | 7/1985 | Yasuhara et al. | 364/510 |

*Primary Examiner*—John R. Lastova
*Attorney, Agent, or Firm*—Sughrue, Mion, Zinn, Macpeak & Seas

[57] ABSTRACT

An improved field instrumentation system employing optical multiplex transmission in which data from a plurality of field devices, including both sensors and controllers, are transmitted through an optical distributor, such as a star coupler, to a master processor at a control panel location as well as to other field devices. The optical distributor branches and couples in a ratio of N:N, the data which are transmitted bidirectionally through the various optical transmission paths connected to the field devices to form the basis of a control loop located in the field. A submaster processor, located in the field and coupled to the optical distributor, is automatically substituted for the master processor in the event that the master processor is disabled. The overall reliability of this system is thereby markedly improved.

13 Claims, 14 Drawing Sheets

FIG. 15A
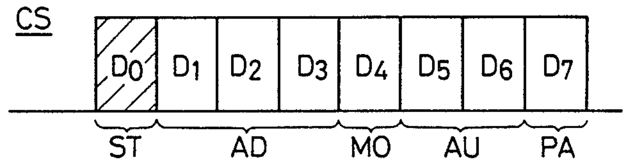
FIG. 15B
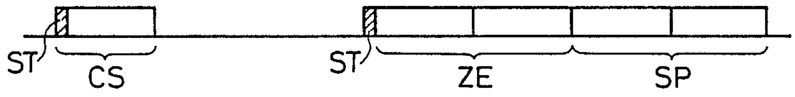
FIG. 15C
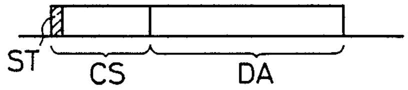
FIG. 15D
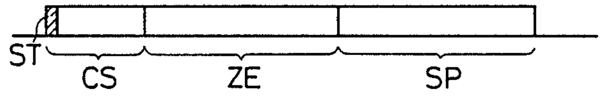
FIG. 16A
FIG. 16B
FIG. 16C
FIG. 16D
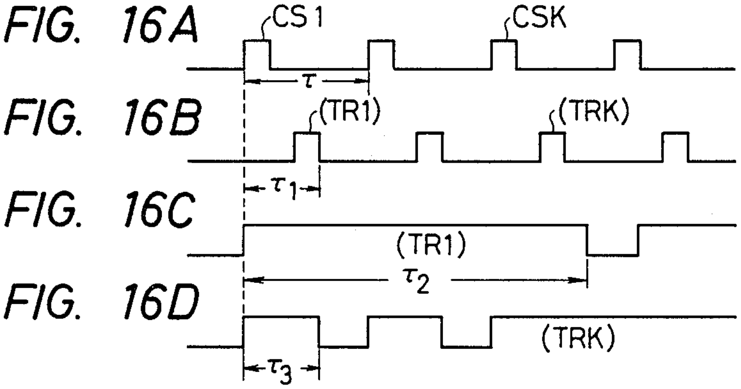

FIG. 18A
FIG. 18B
FIG. 18C
FIG. 18D
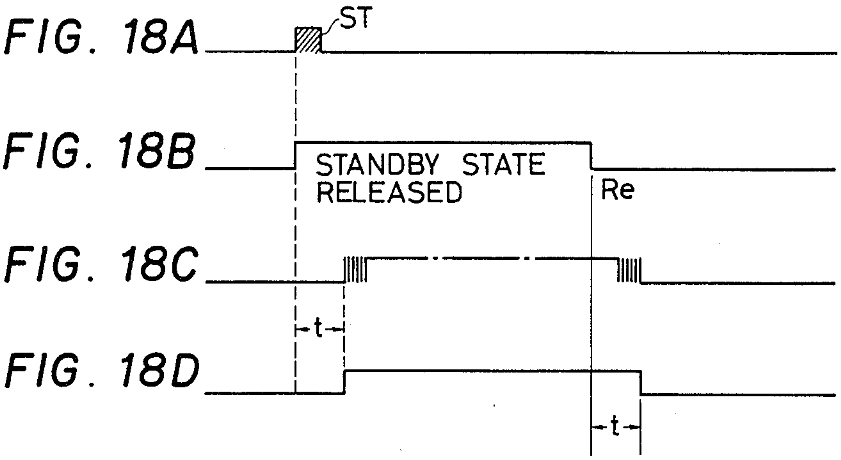
FIG. 19A
FIG. 19B
FIG. 19C
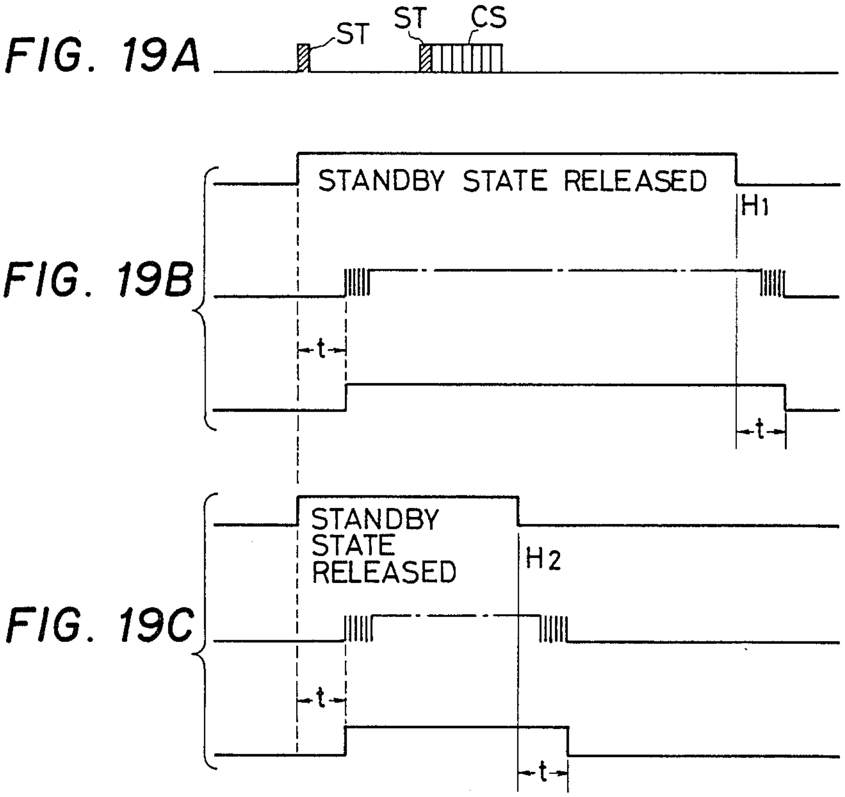

FIELD INSTRUMENTATION SYSTEM

This is a continuation of application Ser. No. 06/550,413, filed 11/10/83, now abandoned.

BACKGROUND OF THE INVENTION

The present invention relates to optical multiplex transmission-type field instrumentation systems. More particularly, the invention relates to an optical multiplex transmission-type field instrumentation system in which data from a plurality of field devices, such as digital measuring units and field controllers for controlling operation terminals, is transmitted in a multiplex mode through optical fiber transmission paths and an optical distributor such as a star coupler to a master processor or a higher processing device on the side of a panel or centralized control room.

In general, in an instrumentation measurement system, a number of sensors or measuring units are installed "in the field", and measurement data from these sensors or measuring units is transmitted to a centralized control room located far from the field to thus monitor and control the particular process with which the control system is associated. Most conventional systems of this type are adversely affected by noise or line surges because they employ electrical signals. Furthermore, the conventional systems suffer from the difficulty that, when they are operated in an explosive atmosphere, it is necessary to provide suitable countermeasures. The above-described sensors or measuring units are, in general, of the analog type. Accordingly, they are adversely affected by external disturbances such as noise and temperature changes, and therefore their accuracy is low.

In order to overcome the above-described difficulties, the present applicant has proposed in Japanese Pat. Appln. 118414/81 a measured data optical multiplex transmission system in which, in order to transmit optical data through a two-way optical transmission path between N digital measuring units measuring physical data and a higher processing device or a master processor, an optical distributor is used to optically couple the single higher processing device and the N measuring units. The optical distributor branches in a ratio of 1:N and optically couples in a ratio of N:1 the optical data which is transmitted bidirectionally through the optical transmission path. Measured data is therein transmitted in a time-division multiplex mode between the measuring units and the higher processing device.

An object of this invention is to provide a field instrumentation system based upon the earlier-proposed system, but which is greatly rationalized and improved in reliability.

SUMMARY OF THE INVENTION

The foregoing object of the invention has been achieved by the provision of a field instrumentation system in which, according to the invention, (1) an N:N optical distributor is provided which branches and couples in the ratio of N:N optical data which is transmitted bidirectionally through optical transmission paths connected to field devices, (2) field controllers, incorporating microcomputers, for controlling operating terminals. The output signals of the measuring units are applied through the N:N optical distributor to the field controllers, thus forming a control loop for the field controllers, whereby the field controllers are directly controlled by the measuring units.

BRIEF DESCRIPTION OF THE DRAWINGS

FIGS. 15A–15D are explanatory diagrams showing formats of data transmitted between the measuring unit and the higher processing device;

FIGS. 16A–16D, taken together, are a timing chart used for a description of the signal transmitting and receiving operation between the measuring unit and the central processing device;

FIGS. 18A–18D and 19A–19C are timing charts used for a description of a method of intermittently driving field devices, specifically the measuring units.

DESCRIPTION OF THE PREFERRED EMBODIMENTS

A preferred embodiment of a field instrumentation system constructed in accordance with the invention will now be described in detail with reference to the accompanying drawings.

Figure 1:
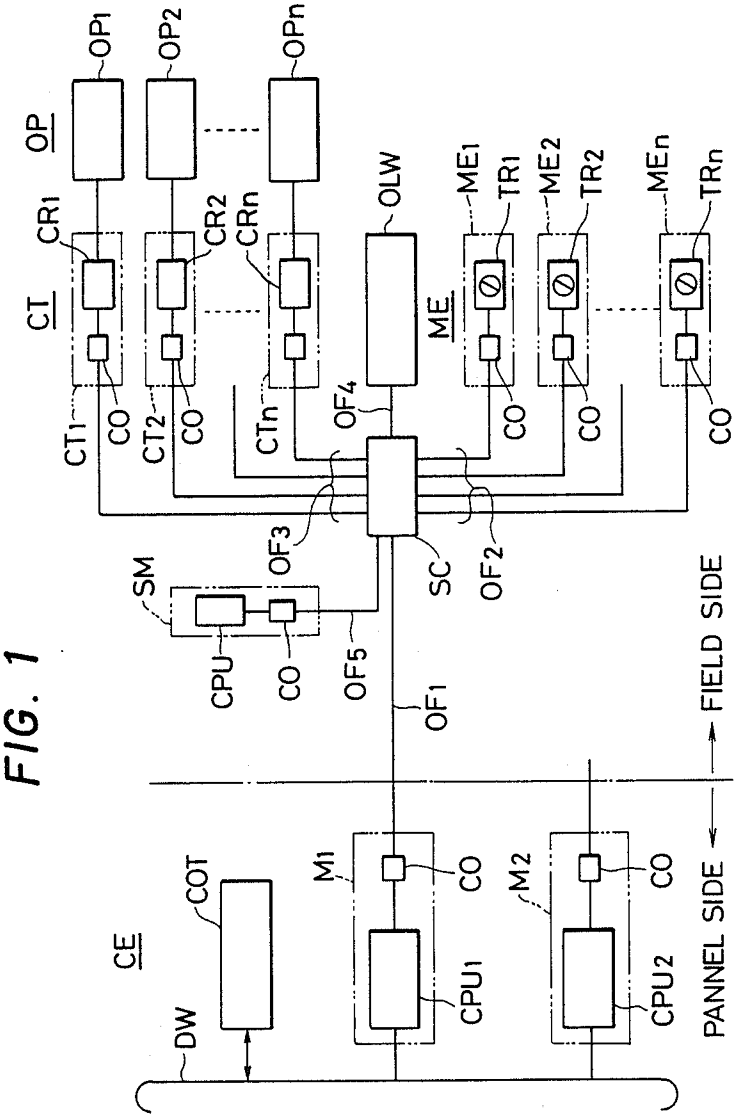
FIG. 1 is a block diagram showing the overall arrangement of a preferred embodiment of a field instrumentation system of the invention.

FIG. 1 is a block diagram showing the overall arrangement of the preferred embodiment of the invention. In FIG. 1, reference character CE designates a central control room; $M_1$ and $M_2$, master processors which comprises host central processing units $CPU_1$ and $CPU_2$ and optical converters CO, each carrying out electric-to-light conversion and light-to-electric conversion, respectively; and COT, a DDC microcontroller. The master processors $M_1$ and $M_2$ and the DDC microcontroller COT may be connected to a host computer through a data bus DW.

Further in FIG. 1, reference character ME designates a digital measuring unit group for measuring various physical data (parameters); CT, a field controller group; OP, an operating terminal group controlled by the field controller group CT; and OLW, a light-to-air-pressure converter. The measuring unit group ME, the field controller group CT and the light-to-air-pressure converter OLW are field devices. The measuring unit group ME is composed of measuring units $ME_1$, $ME_2$, . . . and $ME_n$ which includes transmitters $TR_1$, $TR_2$, . . . and $TR_n$ and optical converters CO for measuring various physical data (such as pressure, differential pressure, temperature, flow rate and displacement). Similarly, the field controller group CT is composed of controllers $CT_1$, $CT_2$, . . . and $CT_n$ which include control units $CR_1$, $CR_2$, . . . and $CR_n$ and optical converters CO. The operating terminal group OP includes, as an example, pneumatic converter $OP_1$, an electropneumatic positioner $OP_2$, and an operating terminal $OP_n$.

Further in FIG. 1, reference character SM designates a submaster processor which is composed of a control processing unit CPU and an optical converter CO.

The master processor $M_1$, the field devices ME, CT and OLW, and the submaster processor SM are connected to an optical relay SC through optical fibers $OF_1$, $OF_2$, $OF_3$, $OF_4$ and $OF_5$. The optical distributor SC, as described below in detail, transmits an optical signal from the master processor $M_1$ to the field devices ME, CT and OLW and the submaster processor SM, and transmits, for instance, the output optical signal of the measuring unit $ME_1$ to the master processor $M_1$, the submaster processor SM and the other field devices. That is, the optical distributor SC is so designed as to branch and couple an optical signal in the ratio of N:N. The optical fiber $OF_1$ is generally several hundreds of meters to several kilometers in length, and the optical fibers $OF_2$ through $OF_5$ are several meters to a hundred meters in length.

Figure 2:
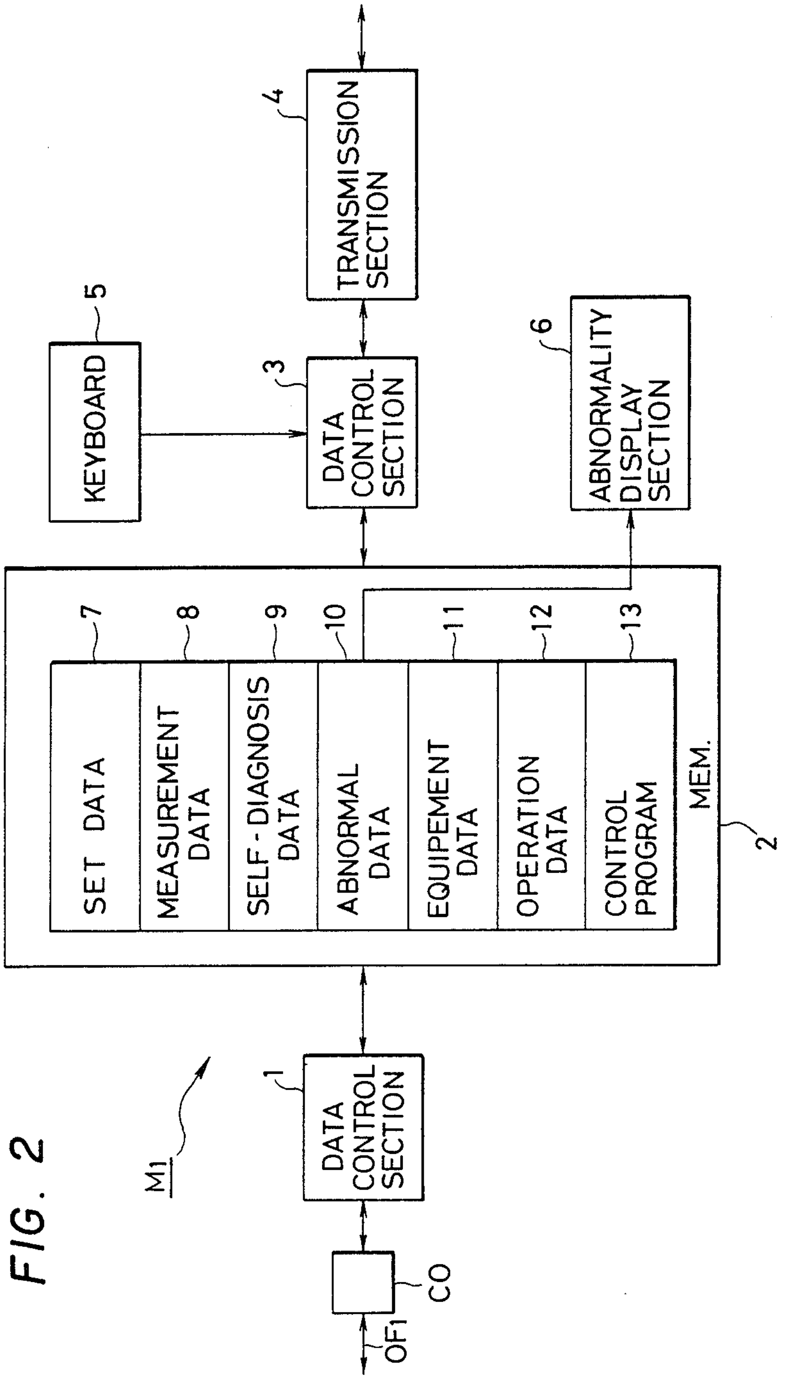
FIG. 2 is a block diagram depicting a master processor (higher processing device)

The master processor $M_1$, as shown in FIG. 2, includes a data control section 1, a memory section 2, a data control section 3, a transmission section 4, a keyboard 5, and an abnormality displaying section 6. The memory section 2 stores set data 7, measurement data 8, self-diagnosis data 9, abnormal data 10, equipment data 11, operation data 12 and a data calling control program 13. The data control section 1 receives instructions from the memory section 2 and transmits them to the field devices, and also applies data from the field devices to the memory section 2. The data control section receives data from the memory section and transmits it to the data bus DW through the transmission section 4, and applies, for instance, a signal from the DC microcontroller COT which is supplied through the data way DW to the memory 2.

Figure 3A:
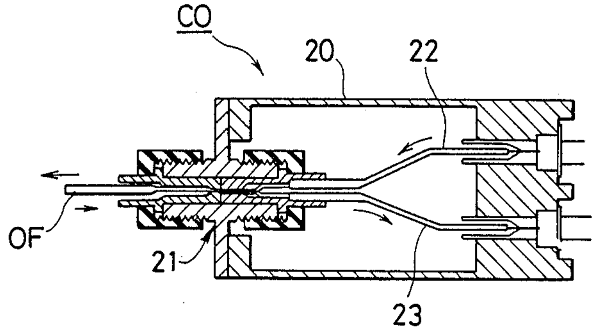
FIGS. 3A–3D are explanatory diagrams showing an optical converter.
Figure 3B:
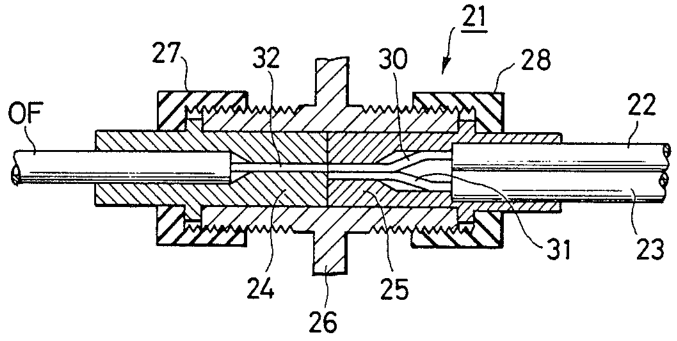
Figure 3C:
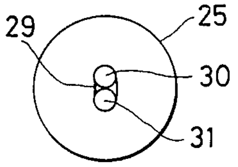
Figure 3D:
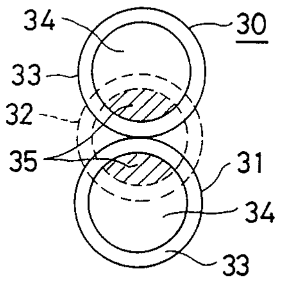
Figure 5:
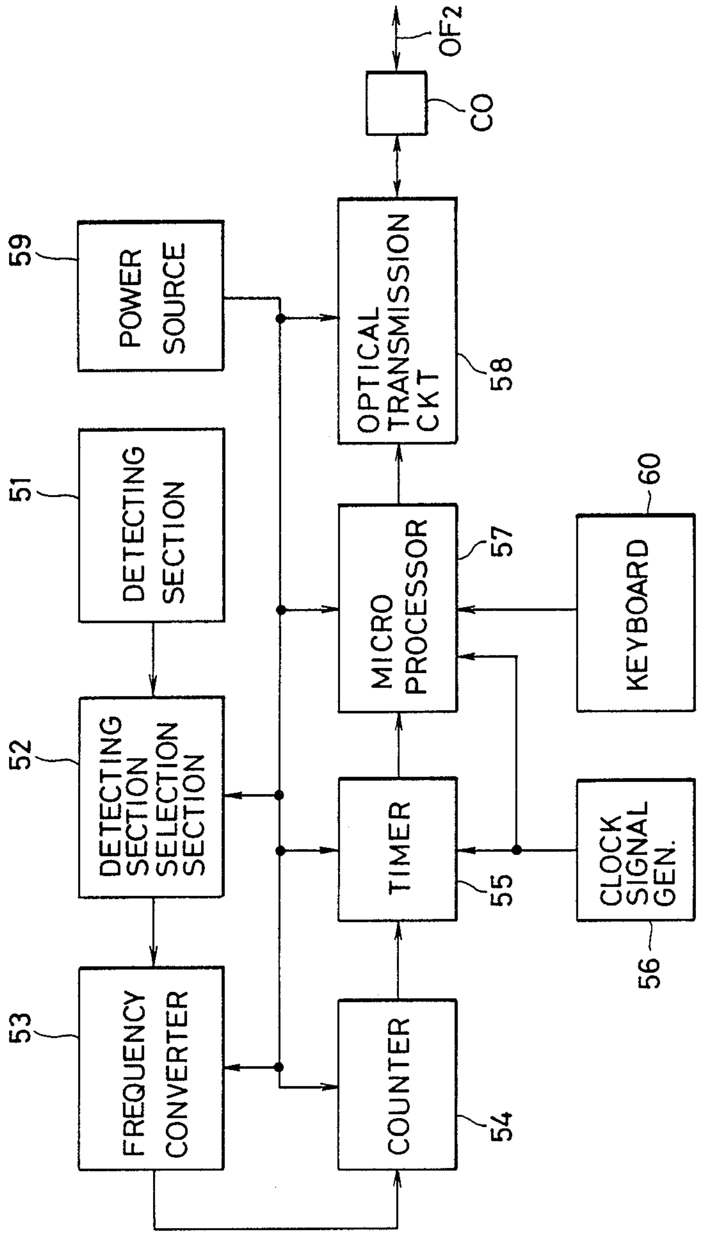
FIG. 5 is a block diagram showing the arrangement of a measuring unit.

An example of the optical converter CO is shown in FIGS. 3A through 3D. With reference to FIG. 3A, the optical converter CO includes a body 20, an optical brancher 21 secured to one side of the body 20, two optical fibers 22 and 23, and a light-emitting element LED and a light-receiving element PD which are provided on the other side of the body 20. The light-emitting element LED operates to convert an electrical signal into an optical signal which is applied through the optical fiber 22 to the optical brancher 21. The light-receiving element PD operates to convert an optical signal supplied through the optical fiber 23 into an electrical signal. The optical brancher 21, as shown in the enlarged sectional view of FIG. 3B, is composed of a fixing member 24 on the light-emitting side, a fixing member 25 on the light-receiving side, and cap nuts 27 and 28 for securing the fixing members 24 and 25 to a holding member 26. The fixing members 24 and 25 have through holes formed therein. An optical fiber OF, corresponding to each of the optical fibers $OF_1$ through $OF_5$ in FIG. 5, is inserted into the fixing member 24, and the optical fibers 22 and 23 are inserted into the fixing member 25. Reference numerals 30, 31 and 32 designate the conductors of the optical fibers 22, 23 and OF, respectively. The conductors 30 and 31 are inserted into the elliptic hole 29 of the fixing member 25 as shown in FIG. 3C. The conductors 30 and 31 and the conductor 32 are arranged as shown in FIG. 3D. In FIG. 3D, reference numeral 33 designates the cladding layers of the conductors 30 and 31; 34, the cores of the conductors 30 and 31; and 35, light-transmitting portions. A light beam transmitted through the optical fiber OF, and accordingly the conductor 32 thereof, branches through the light-transmitting portions 35 into two conductors 30 and 31, that is, the optical fibers 22 and 23, and is converted into an electrical signal by the light-receiving element PD. A light beam transmitted through the optical fiber 22, that is, the conductor 30, from the light-emitting element LED is transmitted through the light-transmitting portion 35 into the conductor 32, specifically, the optical fiber OF.

Figure 4A:
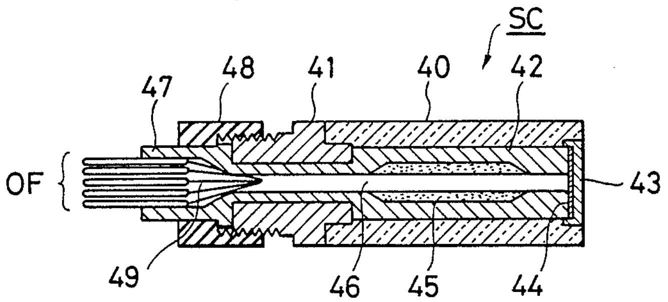
FIGS. 4A and 4B are explanatory diagrams indicating the construction of an optical distributor.
Figure 4B:
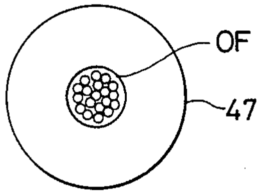

The optical distributor SC, as shown in FIG. 4A, includes a total reflection type optical coupling and distributing unit. More specifically, the optical distributor SC is composed of a body 40, an optical connector adaptor 41, a cylinder 42 inserted into the body 40, a rear plate 43 provided on one side of the body 40, a total reflection film 44 vacuum deposited on the rear surface 43, a mixing rod 46 fixed in the cylinder with adhesive 45, and an optical connector plug 47 secured to the optical connector adaptor 41 with a cap nut 48. The optical fibers OF (corresponding to the optical fibers $OF_1$ through $OF_5$ in FIG. 1) are combined together and inserted into the optical connector plug 47 in such a manner that the conductors 49 thereof extend to the end of the mixing rod 46. Nineteen optical fibers OF are combined together as shown in the FIG. 4B; however, in practice, typically 16 optical fibers are used. For instance when an optical signal is introduced into the optical distributor SC from one optical fiber OF, it is applied through the mixing rod 46 to the total reflection film 44 where it is totally reflected. The optical signal thus reflected is passed through the mixing rod 46 again and is distributed to the remaining optical fibers OF. That is, optical distribution is carried out in the ratio of 1:N. This 1:N optical distributing and coupling action is applied to all the optical fibers. Accordingly, an N:N optical distributing and coupling action is obtained. Thus, the optical distributor SC is an N:N optical distributor.

Figure 6:
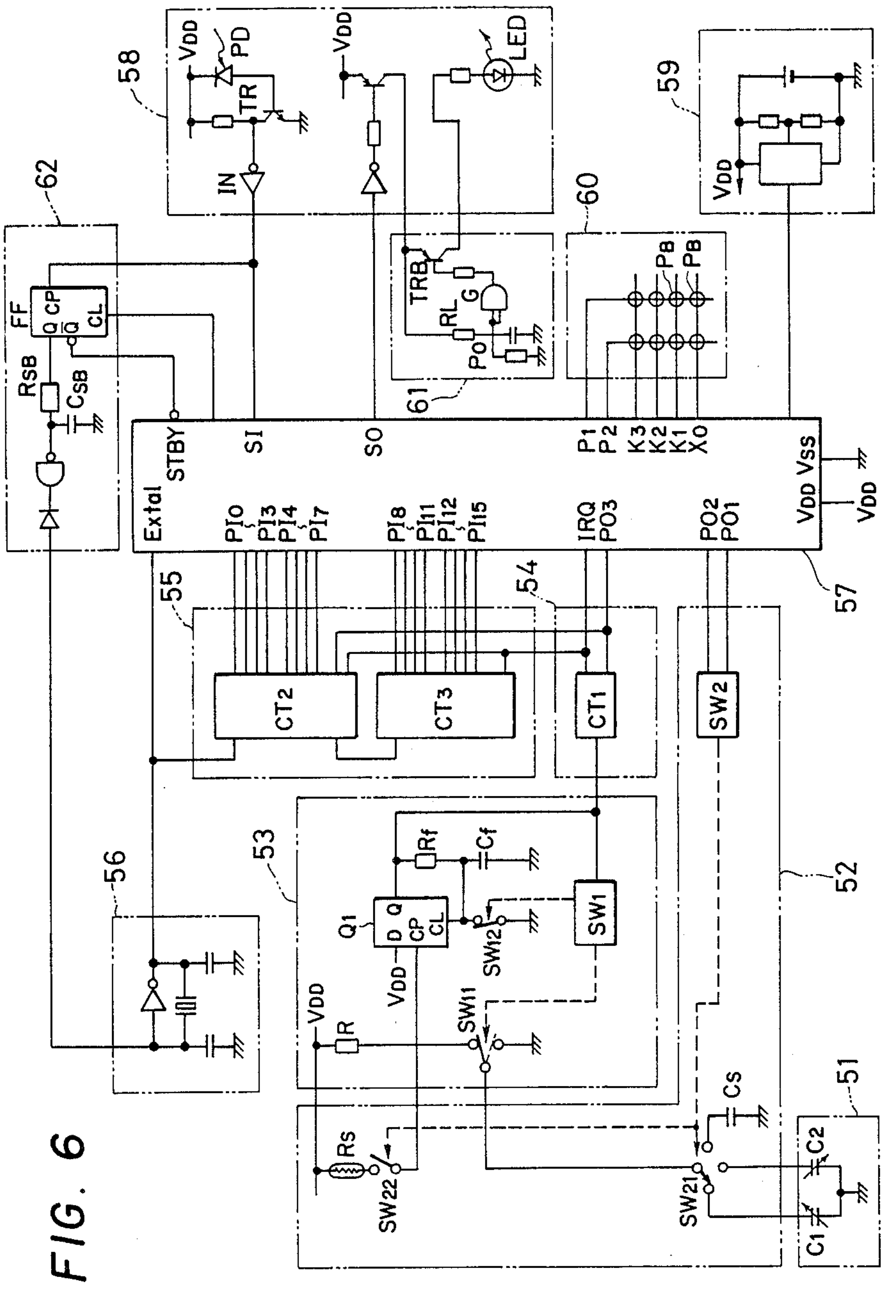
FIG. 6 is a circuit diagram showing the measuring unit in more detail.

Each of the measuring units $ME_1$, $ME_2$, . . . and $ME_n$, as shown in FIG. 5 includes a detecting section 51, a detecting section selecting circuit 52, a frequency converter circuit 53, a counter 54, a timer 55, a reference clock signal generator circuit 56, a microprocessor 57 (hereinafter sometimes also referred to as $\mu$-COM arithmetic circuit), an optical transmission circuit 58, a power source circuit 59 including a battery, and a keyboard 60. The measuring unit is shown in FIG. 6 in more detail. The detecting section 51 is made up of capacitors $C_1$ and $C_2$. The detecting section selecting circuit 52 is composed of the capacitors $C_1$ and $C_2$, a temperature-sensitive capacitor $C_S$, and a CMOS (Complementary MOS) type analog switch device SW2 having switch sections SW21 and SW22. The capacitance-to-frequency converter circuit 53 includes an analog switch device SW1 having switch sections SW11 and SW12 for switching the charging and discharging operations of the capacitors $C_1$ and $C_2$ and setting and resetting a flip-flop circuit $Q_1$, and a flip-flop circuit $Q_1$ which is set when the voltage of the capacitor $C_1$ or $C_2$ exceeds a predetermined threshold level and reset a predetermined period of time after which is determined by the time constant of a resistor $R_f$ and a capacitor $C_f$. If an ordinary D-type flip-flop circuit is employed, it is necessary to provide a circuit, such as a Schmitt trigger circuit, for discriminating the threshold level in the front stage of the flip-flop circuit. If, on the other hand, a CMOS flip-flop circit is employed, it is not necessary to provide such a circuit, since the switching voltage of the circuit can be used as the threshold level.

The timer 55 includes two counters CT2 and CT3. The timer 55 starts counting clock pulses from the reference clock signal generator circuit 56 when application of a reset signal from the μ-COM arithmetic circuit 57 is suspended, and stops the counting operation in response to a count-up signal from the counter (CT1) 54. The μ-COM arithmetic circuit 57 is driven by the output clock signal of the reference clock signal generator circuit 56 and performs various operations and controls. For instance, the circuit 57 applies mode selection signals $PO_1$ and $PO_2$ to the analog switch SW2 in the detecting section selecting circuit 52 to select a capacitor $C_1$ measurement mode, a capacitor $C_2$ measurement mode or a temperature measurement mode (by using the resistor $R_S$ and the capacitor $C_S$). When measurement is not being carried out, the circuit 57 applies the reset signal $PO_3$ to the counter 54 and the timer 55 to reset them. When measurement is being carried out, the circuit 57 suspends the application of the reset signal $PO_3$ to thus start the counting operation. Upon receiving the count-up signal of the counter 54 as an interrupt signal IRQ, the count output of the timer 55 is read through terminals $PI_0$ through $PI_{15}$, thereby to perform predetermined arithmetic operations.

The μ-CMOC arithmetic circuit 57 is coupled to the keyboard 60 used for setting the zero point or span to prevent mesurement error, a standby mode circuit 62 for intermittently operating the reference clock signal generator circuit 56 or the μ-COM arithmetic circuit 57 to economically use electric power, the optical transmission circuit 58 for transmitting optical data between the measuring unit and the host computer in the control room, and a circuit 61 for detecting when the light-emitting element LED in the circuit 58 is faulty. The battery power source circuit 59 may be a solar battery. The light-emitting element LED and the light-receiving element PD are built into the optical converter as shown in FIG. 3.

Figure 7A:
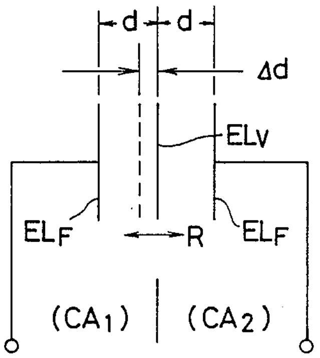
FIGS. 7A and 7B are explanatory diagrams used for a description of the principle of detection in which a displacement is detected by converting it into a capacitance.

In the above-described measuring unit, a mechanical displacement such as a pressure is detected by converting the displacement into a change in a capacitance valve, and the capacitance valve is converted into digital data for measurement. The principle of such detection will be described with reference to FIGS. 7A and 7B. As shown in FIG. 7A, a movable electrode $EL_V$ is interposed between two stationary electrodes $EL_F$. The movable electrode $EL_V$ is moved horizontally (as indicated by the arrow R) in response to a mechanical displacement such as may be caused by a pressure charge. The capacitance $CA_1$ between the movable electrode and one of the stationary electrodes increases as the capacitance $CA_2$ between the movable electrode and the other stationary electrode decreases, and vice versa. That is, the capacitance $CA_1$ and $CA_2$ change differentially. When the movable electrode $EL_V$ moves through a distance Δd as indicated by the dotted line in the FIG. 7A, the capacitances $CA_1$ and $CA_2$ are as follows:

$$CA_1=\epsilon A/(d-\Delta d), \text{ and}$$

$$CA_2=\epsilon A/(d+\Delta d),$$

where A is the area of each electrode, ε is the dielectric constant of the material between the electrodes, and d is the distance between the movable electrode and the stationary electrode. Rearranging the equations above:

$$CA_1+CA_2=\epsilon A2d/(d^2-\Delta d^2),$$

$$CA_1-CA_2=\epsilon A2\Delta d/(d^2-\Delta d^2), \text{ and hence}$$

$$(CA_1CA_2)/(CA_1+CA_2)=\Delta d/d.$$

Thus, the displacement Δd can be calculated as $$(CA_1-CA_2)/(CA_1+CA_2)d.$$

Figure 7B:
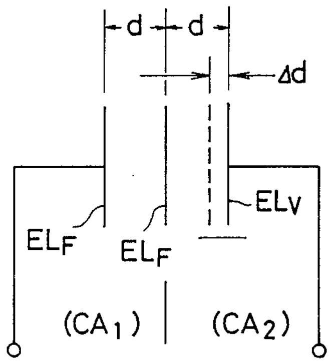

Referring to FIG. 7B, the movable electrode $EL_V$ is here disposed outside the two stationary electrodes $EL_F$. When the movable electrode $EL_V$ is displaced by Δd, for instance, by an external pressure change, the capacitances $CA_1$ and $CA_2$ are as follows:

$$CA_1=\epsilon A/d, \text{ and}$$

$$CA_2=\epsilon A/(d+\Delta d).$$

(In this case, the capacitance $CA_1$ is constant, while the capacitance $CA_2$ is variable.)

The difference between $CA_1$ and $CA_2$ is:

$$CA_1-CA_2=\epsilon A\Delta d/d(d+\Delta d)$$

The ratio of $(CA_1-CA_2)$ to $CA_2$ is thus:

$$(CA_1-CA_2)/CA_2=\Delta d/d.$$

Therefore, the displacement Δd can be detected as a variation in capacitance.

As is apparent from these equations, the displacement is a function of the capacitance only; that is, the detection is not affected by the dielectric constant of the dielectric between the electrodes or by stray capacitances. Accordingly, mechanical displacements can be accurately detected from capacitance changes.

Figures 8A, 8B, 8C, 8D, 8E, 8F, 8G:
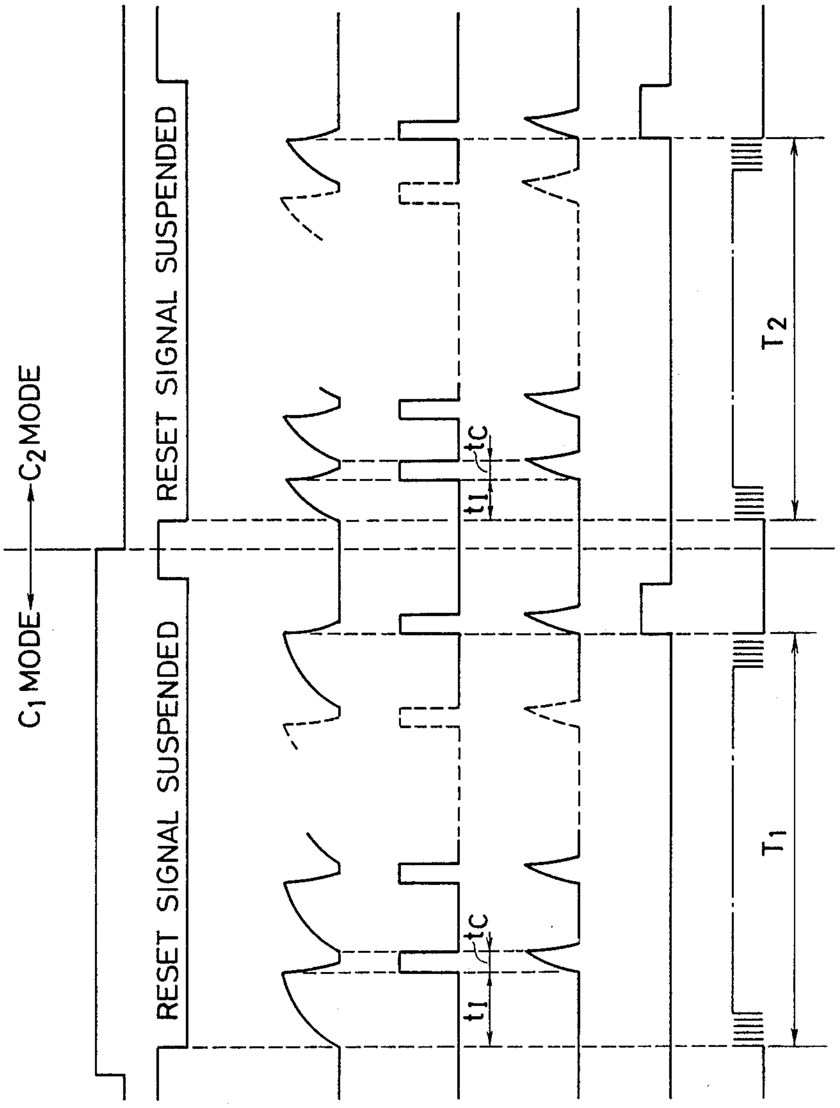
FIGS 8A–8G, taken together, are a timing chart for a description of the operation of the circuit of FIG. 6.
Figure 9:
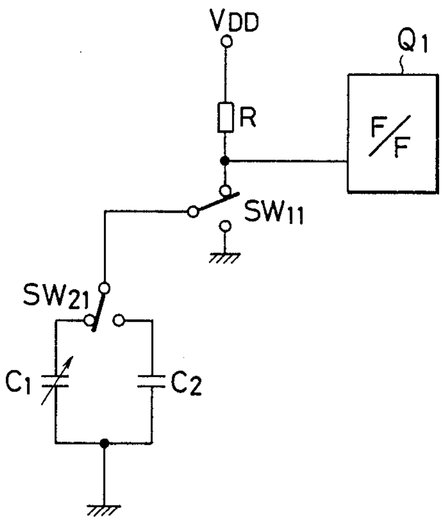
FIG. 9 is a circuit diagram showing another example of a capacitance detecting section.

Measurement according to the above-described principle of detection will be described with reference mainly to FIGS. 6 and 8. In the initial state, the mode selection signals $PO_1$ and $PO_2$ are not outputted by the μ-COM arithmetic circuit 57 so that the counter (CT1) 54 and the timer 55 are maintained reset by the reset signal $PO_3$. When under this condition, a capacitor $C_1$ measurement mode signal is generated, as shown in FIG. 8A, and the application of the reset signal $PO_3$ is suspended, as shown in FIG. 8B, a circuit composed of the capacitor $C_1$, switch sections SW21 and SW11, resistor R and power source $V_{DD}$ is formed, and the capacitor $C_1$ is charged, as shown in FIG. 8C. The voltage across the capacitor $C_1$ will exceed the threshold voltage $V_{TH}$ of the flip-flop circuit Q1 after a period of time $t_1$, whereupon the flip-flop circuit Q1 is set and an output is provided at the output terminal Q. This output is applied to the resistor $R_f$ and the capacitor $C_f$, and also to the analog switch means SW1. As a result, the switch section SW12 is opened, and the resistor $R_f$ and the capacitor $C_f$ form a charging circuit. At the same time, the armature of the switch section SW11 is set to a position indicated by the dotted line, and the capacitor $C_1$ is discharged. When the voltage of the capacitor $C_f$ has reached a predetermined value after a period of time $t_c$, the flip-flop circuit $Q_1$ is reset. As a result, the flip-flop circuit $Q_1$ provides an output pulse having a predetermined pulse width $t_c$. When the flip-flop circuit $Q_1$ is reset, the analog switch device SW1 is turned off, and therefore the switch section SW12 is restored, as shown in FIG. 6, thus forming a circuit for discharging the capacitor $C_f$. Since the period of time $t_1$ is proportional to the values of the capacitor $C_1$ and the resistor R, the output pulse signal of the flip-flop circuit $Q_1$ has a frequency proportional to the capacitance of the capacitor $C_1$.

The pulses of this signal are counted by the counter 54. When the content of the counter 54 reaches a predetermined value, the counter 54 generates a pulse, as showin in FIG. 8F, (a count-up output) which stops the counting operation of the timer 55, as indicated in FIG. 8G. When the application of the reset signal $PO_3$ is suspended as described above, the timer 55 starts counting the clock pulse from the pulse signal generator circuit 56. The count value of the timer 55 is read, via the terminals $PI_0$ through $PI_{15}$, by the $\mu$-COM arithmetic circuit 57, which receives the count-up signal from the counter 54.

The threshold voltage $V_{TH}$ of the flip-flop circuit $Q_1$ is:

$$V_{TH} = V_{DD}\left(1 - e^{\frac{t1}{-RC}}\right).$$

Therefore, the charging time $t_1$ of the capacitor $C_1$ (see FIG. 8D) is:

$$t_1 = -R\,C_1 \log_e\left(1 - \frac{V_{TH}}{V_{DD}}\right).$$

Similarly, the time $t_c$ is:

$$t_c = -R_f C_f \log_e\left(1 - \frac{V_{TH}}{V_{DD}}\right).$$

The values of the resistor $R_f$ and the capacitor $C_f$ are fixed, and therefore the time $t_c$ is constant.

Accordingly, the charge and discharge time $T_1$ of the capacitor $C_1$ can be obtained by counting the clock pulses which are produced until n charge and discharge operations of the capacitor $C_1$ have been counted; that is, the time $T_1$ can be obtained from the output of the timer 55. As is apparent from FIG. 8D, the charging operation ($t_1$) is repeated n times, while the discharging operation ($t_c$) is repeated $(n-1)$ times. Therefore, the total charge and discharge time $T_1$ is as follows:

$$T_1 = nt_1 = (n-1)t_c. \qquad (1)$$

The reason why the n charge and discharge operations are carried out and counted is to improve the resolution of the time measuring counter (CT2 and CT3). The value n is suitably determined from the output frequency of the reference clock signal generator circuit 56, the value of the resistor R, and the capacitance of the capacitor $C_1$.

After the total charge and discharge time $T_1$ of the capacitor has passed, the $\mu$-COM arithmetic circuit 57 produces the signal $PO_1$ or $PO_2$ to operate the switch section SW21 to obtain the capacitor $C_2$ detection mode, whereupon the charge and discharge time $T_2$ of the capacitor $C_2$ is measured. A timing chart relating to this measurement is shown in the right-hand half of FIG. 8. Similar to the case of the charge and discharge time $T_1$ in expression (1), the charge and discharge time $T_2$ is determined as follows:

$$T_2 = nt_2 + (n-1)t_c. \qquad (2)$$

The $\mu$-COM arithmetic circuit 57 performs the following operations by utilizing the above-described expressions (1) and (2):

$$T_1 + T_2 - 2(n-1)t_c = -R \cdot (C_1 + C_2) \log_e\left(1 - \frac{V_{TH}}{V_{DD}}\right), \text{ and} \qquad (3)$$

$$\frac{T_1 - T_2}{T_1 + T_2 - 2(n-1)}\,t_c = \frac{C_1 - C_2}{C_1 + C_2}$$

As is apparent from the above description of the principle of detection, the value of expression (3) is in proportion to the displacement. Therefore, the displacement can be determined by the above-described operation of the $\mu$-COM arithmetic circuit 57.

In the above-described embodiment, mechanical displacements, such as due to a differntial pressure $\Delta P$, are measured by differentially varying the capacitances of the capacitors $C_1$ and $C_2$. However, it can be readily understood from the above-described principle of detection that the same technical concept can be similarly applied to a measuring technique in which one of the capacitors $C_1$ and $C_2$ is fixed and the other is variable. In this case, instead of the differential pressure $\Delta P$, the pressure P is obtained, and the following arithmetic expression is utilized:

$$P = \frac{C_1 - C_2}{C_2} = \frac{T_1 - T_2}{T_2 - (n-1)t_c}. \qquad (4)$$

In the above-described embodiment, a mechanical displacement is detected by converting it into a capacitance. However, it should be noted that the same effect can be obtained by converting the mechanical displacement into a resistance, frequency or voltage.

Figure 10A:
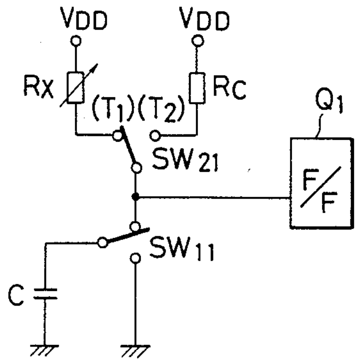
FIGS. 10A–10C are circuit diagrams showing examples of a resistance detecting section.
Figure 10B:
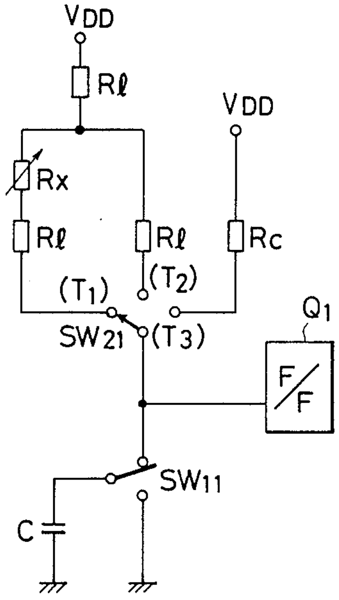
Figure 10C:
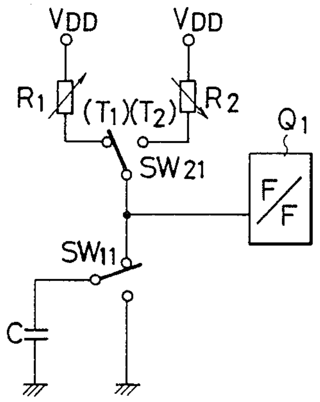
Figure 11:
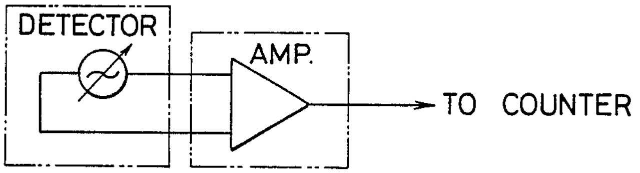
FIG. 11 is a circuit diagram showing an example of a frequency detecting section.
Figure 12:
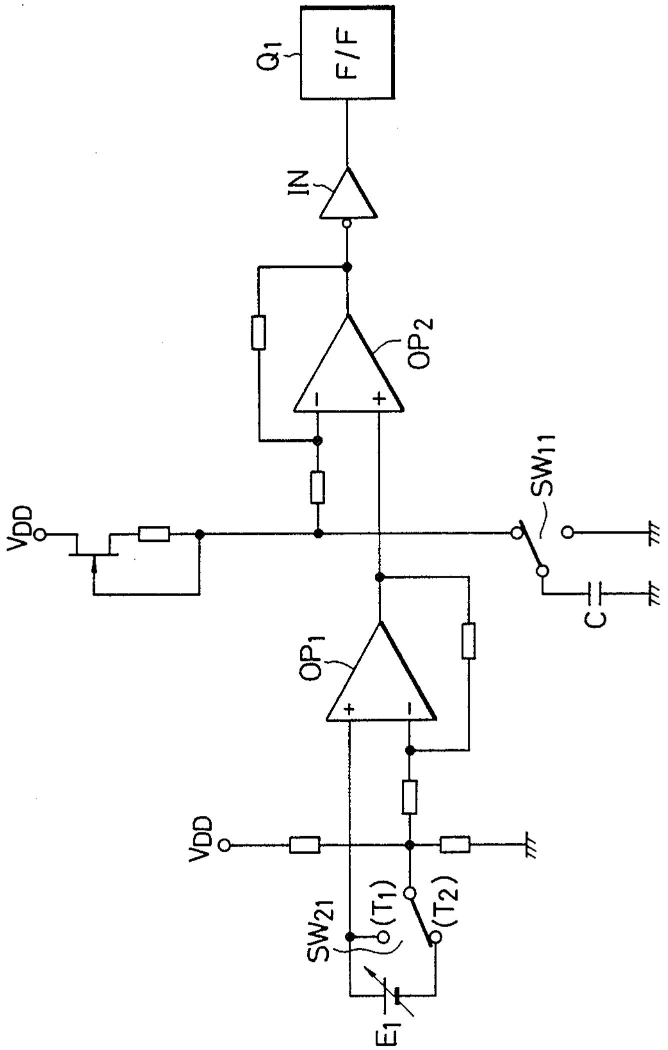
FIG. 12 is a circuit diagram showing an example of a voltage detecting section.

FIGS. 10A–10C, 11 and 12 show other examples of the detecting section. In FIGS. 10A–10C, the mechanical displacement is converted into a resistance. In FIG. 11, the mechanical displacement is converted into a frequency. In FIG. 12, the mechanical displacement is converted into a voltage. In these figures, the capacitance of a capacitor C and the resistance of a resistor $R_c$ are predetermined, and switch sections SW11 and SW21 and a flip-flop circuit $Q_1$ are similar to those shown in FIG. 3.

The principle of detection shown in each of FIGS. 10A–10C is completely the same as the principle of detection based on a capacitance. That is, a resistance value is detected by utilizing the fact that a charge and discharge time is proportional to the product of a capacitance and a resistance.

In the example of FIG. 10A, the armature of the switch 21 is set to the side of the resistor $R_x$ to measure a charge and discharge time $T_1$ (although, strictly, only a charge time is measured), and then the armature of the switch 21 is set to the side of the resistor $R_c$ to measure a charge and discharge time $T_2$. The resistance of the resistor $R_x$ can then be obtained from the following equation:

$$\frac{R_x}{R_c} = \frac{T_1 - (n-1)\,t_c}{T_2 - (n-1)\,t_c}.$$

The circuit shown in FIG. 10C corresponds to the above-described embodiment in which the capacitors $C_1$ and $C_2$ are replaced by resistors $R_1$ and $R_2$. Therefore, the relevant equation can be written as follows:

$$\frac{T_1 - T_2}{T_1 + T_2 - 2(n-1)\,t_c} = \frac{R_1 - R_2}{R_1 + R_2}.$$

In the example of FIG. 10B, a line resistance $R_l$ varies. The switch section SW21 is operated to select $R_x+2R_l$, $2R_l$ and $R_c$ so that charge and discharge times $T_1$, $T_2$ and $T_3$ are measured. Then, the resistance $R_x$ is obtained from the following equation:

$$\frac{T_1 - T_2}{T_3 - (n-1)t_c} = \frac{R_x}{R_c}.$$

In the case of FIG. 11, the mechanical displacement is converted into a frequency by the detecting section, which may be implemented with a Karman vortex flow meter, for instance. Therefore, the provision of the frequency converter circuit as shown in FIG. 6 is unnecessary, and the output of the detecting section is suitably amplified and applied directly to the counter. In this case, a time T required for the counter to count a predetermined number N is calculated to obtain the frequency N/T.

In FIG. 2, the mechanical displacement is converted into a voltage $E_1$ for detection. A predetermined current (I) flows in a capacitor C. The voltage of the capacitor C is applied to one input terminal of an operational amplifier $OP_2$, to the other terminal of which an input voltage $E_1$ amplified by an operational amplifier $OP_1$ is applied. When the voltage across the capacitor C exceeds the input voltage, the flip-flop circuit $Q_1$ is set. While the capacitor C is being charged, the input voltage $E_1$ varies, and a time signal is obtained in correspondence to the voltage value. The voltage value $E_1$ can be obtained from the following equation:

$$T_2 - T_1 = C_x/I \cdot E_1,$$

where $T_2$ is the time measurement output when the armature of the switch section SW21 is positioned as shown in FIG. 12, $T_1$ is the time measurement output when the armature of the switch section SW21 is correspondingly set, I is the current flowing through the capacitor C, and $C_x$ is the capacitance value of the capacitor C.

Figure 13:
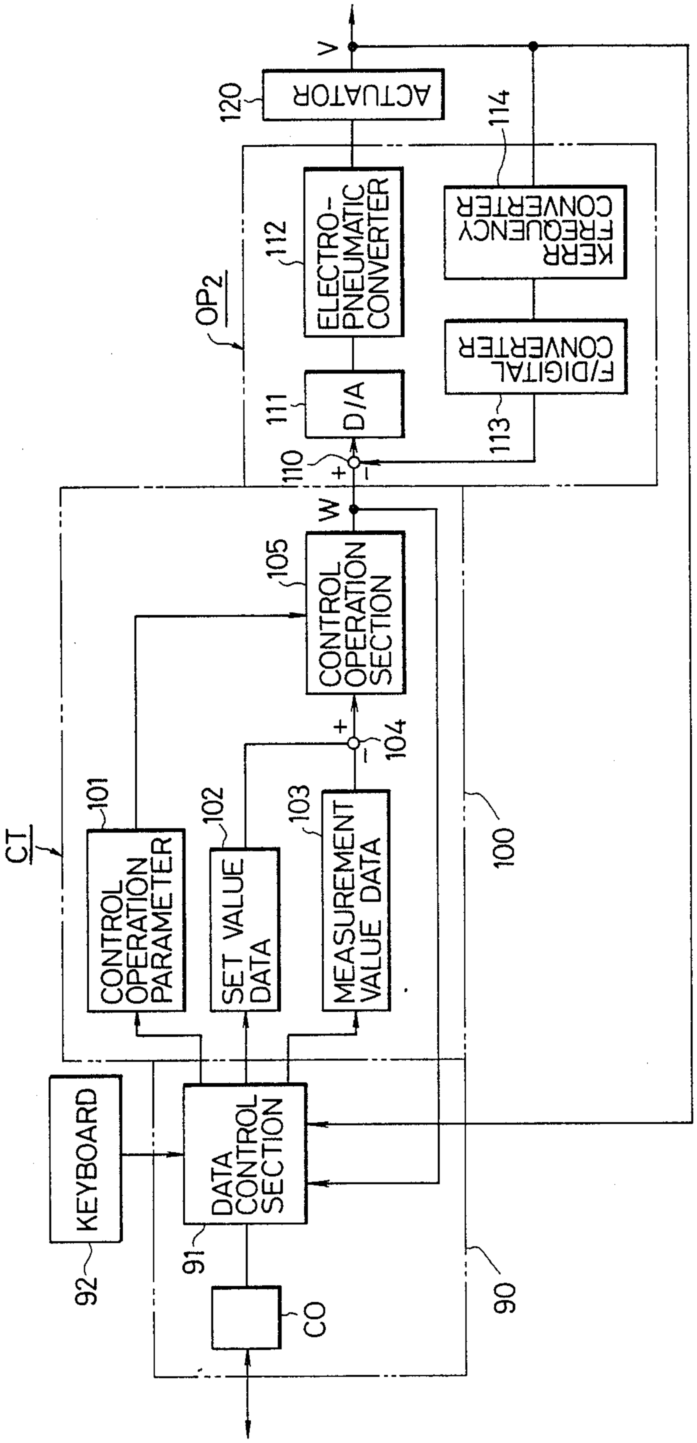
FIG. 13 is a block diagram showing the arrangement of a field controller and an operating terminal (electropneumatic positioner)

Each field controller CT and each operating terminal OP (for instance the electropneumatic positioner $OP_2$) are constructed as shown in FIG. 13. The filed controller CT is composed of a transmission unit 90, having a data control section 91, and a controller section 100, having a control operation section 105. The data control section 91 and the controller section 100 are implemented with microcomputers. In response to data inputted through the optical circuit CO, the data control section 91 reads set value data 102 and measurement value data 103 out of the memory. This data is subjected to addition (as indicated at 104), and the result of addition is applied to the control operation section 105. Further, the data control section 91 reads control operation parameter (such as P, I and D values) data 101 from the memory, which is applied to the control operation section 105 with which an amount of operation W (such as an output pneumatic pressure or a valve stroke) is calculated. The field controller CT can remotely set the control operation parameter 101 and the set value data 102 in response to an instruction from the master processor $M_1$. The amount of operation W for the operating terminal $OP_2$ is applied to the data control section 91 also, and is returned to the side of the panel (central control room) in response to an instruction from the master processor $M_1$. The amount of operation W is applied to the electropneumatic positioner $OP_2$, which is composed of a matching point 110, a D-A (digital-to-analog) converter 111, an electropneumatic converter 112, a Kerr frequency converter section 114, and a frequency-to-digital signal converter section 113.

The matching point 110 and the D-A converter 111 form a comparison section. The frequency-to-digital signal converter section 113 and the Kerr frequency converter section 114 form a feedback section. The output of the electropneumatic converter section 112 is applied to an actuator 120, where it is converted into a valve stroke V. The valve stroke V is converted into a frequency signal by the Kerr frequency converter 114, which is fed back to the comparison section. In FIG. 13, reference numberal 92 designates a keyboard located "in the field". Each field controller CT and each operating terminal OP are powered by batteries (not shown).

Figure 14:
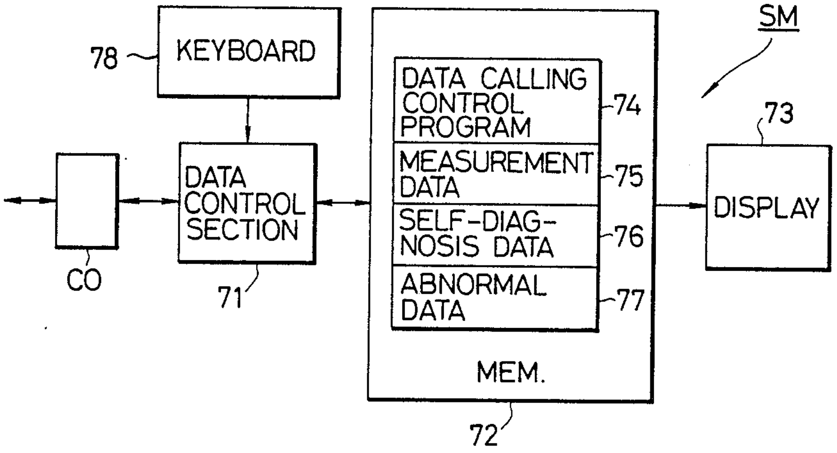
FIG. 14 is a block diagram showing the arrangement of a submaster processor.

The submaster processor SM, as shown in FIG. 14, includes a data control section 71, a memory section 72, a field display device 73 and a keyboard 88. A data calling control program 74, measurement data 75, self-diagnosis data 76 and abnormal data 77 are stored in the memory section. The measurement data 75 and the abnormal data 77 are displayed on the display device 73. The submaster processor SM is powered by a battery (not shown).

Data transmission of the thus-organized field devices (the measuring unit group ME, the field controller group CT and the light-to-air pressure converter OLW), the submaster processor SM and the master processor $M_1$ will now be described.

Figure 17:
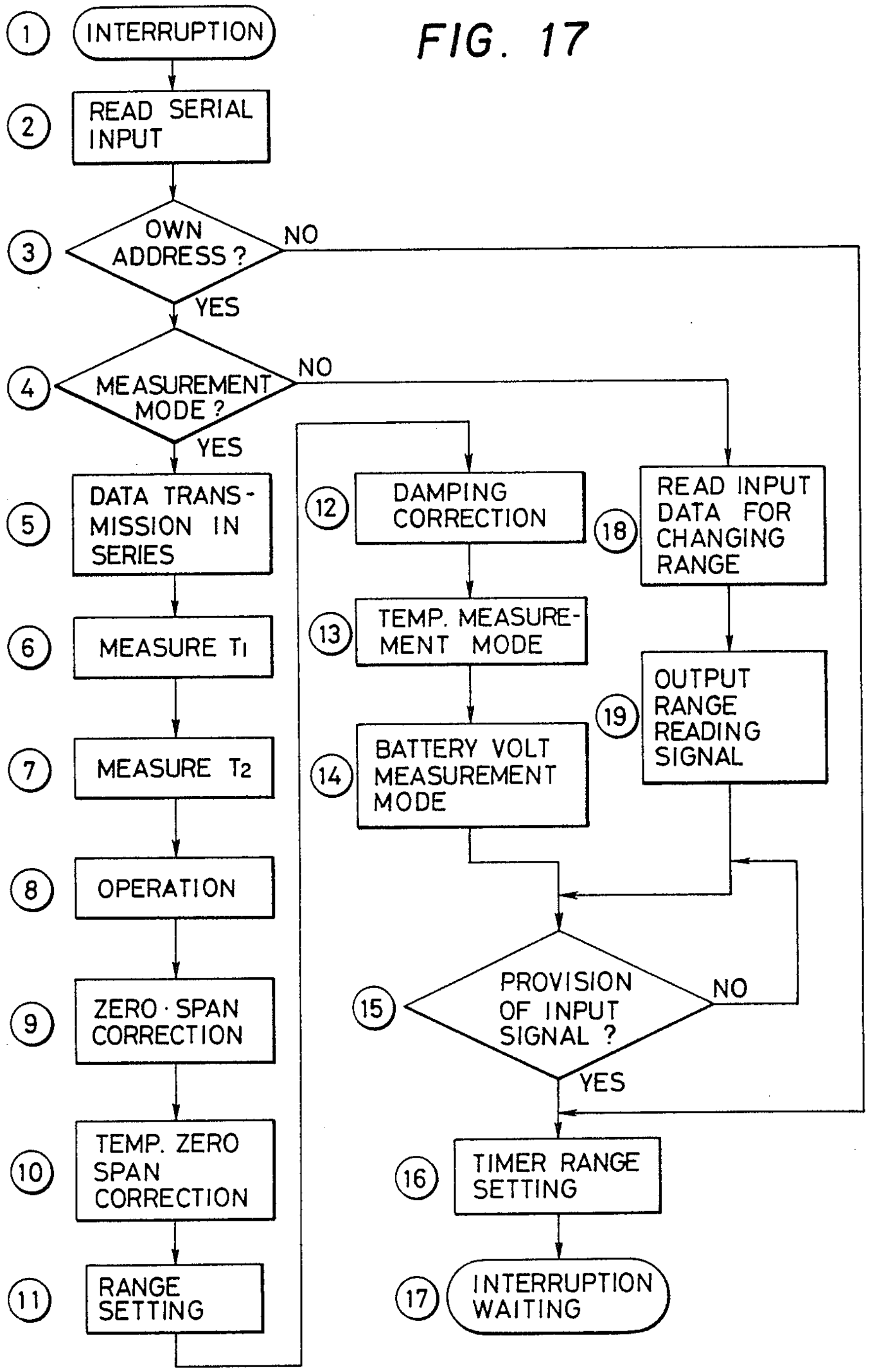
FIG. 17 is a flow chart showing the operations of the measuring unit.

FIGS. 15A–15D depict data transmitted between the measuring unit group ME and the master processor $M_1$. More specifically, FIG. 15A shows control data CS, FIG. 15B a data format used when the master processor $M_1$ sets a measurement range for the measuring unit (hereinafter referred to as "a range setting mode", when applicable), FIG. 15C a data format used when measurement data is transmitted to the master processor $M_1$ from the measuring unit (hereinafter referred to as "a measurement mode", when applicable), and the FIG. 15D a format of data which is returned to the master processor $M_1$ in order to check the reception of range setting data from the master processor $M_1$. FIGS. 16A–16D, taken together, are a timing chart describing the transmission of data between the measuring unit and the master processor $M_1$. FIG. 17 is a flow chart describing the signal transmission and reception of the measuring unit.

The control data CS, as shown in FIG. 15A, is composed of a start bit ST ($D_0$), address data AD ($D_1$, $D_2$ and $D_3$) identifying the various measuring units, mode data MO ($D_4$) representing the measurement mode or the range setting mode, preliminary data AU ($D_5$ and $D_6$), and a parity bit PA ($D_7$). In the measurement mode, when the data shown in FIG. 15A is sent to the measuring unit group from the master processor $M_1$, the control data CS and measurement data DA, as shown in FIG. 15C are applied to the master processor $M_1$ from an addressed measuring unit. All the measuring units are started by the start bit ST at the same time, but the measuring units which have not been addressed half their operations in a predetermined period of time. In the range setting mode, the control data CS, as shown in FIG. 15C, is applied to the measuring unit, then after a predetermined period of time the zero point data ZE and span data SP, including the start bit ST, are applied thereto. In this case, the measuring unit returns the same data as shown in FIG. 15D, thereby reporting to the master processor $M_1$ that it has received the range setting data correctly.

It is assumed that as the master processor $M_1$ provides control data, as shown in FIG. 16A, the measuring unit $ME_1$ is selected by the control data $CS_1$ and the measuring unit $ME_K$ is selected by the control signal CSK. The measuring units $ME_1$ and $ME_K$ receive the data $CS_1$ and $CS_K$ in predetermined periods of time, as shown in FIG. 16B. Accordingly, the measuring unit $ME_1$ operates, as depicted in FIG. 16C, and the measuring unit $ME_K$ stops its operation upon receipt of the data CS1 in a predetermined period of time $\tau_3$ and starts the operation by the data CSK, as shown in the FIG. 16D. If, in this case, the data transmitting interval $\tau$ (FIG. 16A) of the master processor $M_1$ is longer than the signal reception completion time $\tau_1$ (FIG. 16B) and longer than one cycle $\tau_2$ for calling the same address measuring unit (a measurement operation time per measuring unit), then the measuring unit access time intervals or the measuring unit selecting order can be determined freely for the transmission of data.

The detailed operation, including signal transmission and reception, of the measuring units is as follows: First, the operation of the measuring unit (transmitter) will be described with reference FIG. 17. The processing device μ-COM in the transmitter is started by the interrupt signal (start signal) from the host coumputer $M_1$ (Step 1). The transmitter reads the input signal (control data) as shown in FIGS. 15A–15D (Step 2). The transmitter detects whether or not its own address has been specified by the input signal (Step 3). When its own address is not specified, the transmitter is placed in an interrupted waiting state (Step 17) in a certain period of time (Step 16) so that it may not be erroneously operated by range setting data which is applied to another transmitter. If the address is in fact specified by the input signal, it is detected whether or not the measurement mode is selected (Step 14). In the case where the measurement mode is not selected, input data for changing the range is read (Step 18). In order to confirm the data thus read, the latter is returned to the master processor $M_1$ on the side of the panel (Step 19 ). In order to prevent the transmitter from being erroneously operated by another input signal, the transmitter is placed in the interrupted waiting state (Step 17) a predetermined period of time (Step 16) after the provision of that input signal has been confirmed (Step 15). When it has been determined that the measurement mode is effected in Step 4, the results of the preceding operation are transmitted in series (Step 5), the charge and discharge time $T_1$ is measured to perform predetermined operations (Step 6), the time $T_2$ is measured if necessary (Step 7), and the specified predetermined operations are performed by using this measurement data (Step 8). Then, zero correction and the span correction are carried out (Step 9).

Similarly, the temperature zero and span corrections are carried out (Step 10). Thereafter, the range is adjusted according to the range setting data which has been supplied from the master processor $M_1$ on the side of the panel (Step 11), and if damping has occurred, it is corrected according to a predetermined algorithmic expression (Step 12). Then, the measurement of temperature is carried out (Step 13), and the battery voltage is measured (Step 14). Then, similar to the above-described case, in order to prevent the transmitter from being erroneously operated by another input signal, the transmitter is placed in the interrupted waiting state (Step 17) the predetermined period of time (Step 16) after the provision of that input signal has been confirmed (Step 15).

The measuring unit ME is powered by the battery power source circuit 59, as shown in FIGS. 5 and 6. The power consumption is reduced by only intermittently driving the digital processing section and the clock signal generator circuit 56 for driving the digital processing section. A method of intermittently driving the clock signal generator circuit 56 and the processing circuit 57 in the measuring unit will be described. To facilitate understanding of such an operation, first, a single operation with the host processing device $M_1$ connected to a measuring unit in the ratio of 1:1 will be described with reference to FIGS. 6 and 18A–18D, and then a parallel operation with the host processing device $M_1$ connected to a plurality of measuring units will be described with reference to FIGS. 1 and 19A–19C.

The measuring unit performs predetermined operations according to instructions received from the central processing device $M_1$ provided in the central control room. Those instructions are received via the light-emitting element PD in the optical transmission circuit 58. When the light-emitting element PD receives an instruction (a signal ST in FIG. 18A), the transistor TR is rendered conductive and a low level signal is applied to the inverter IN. Accordingly, a high level signal is applied to an input terminal of μ-COM arithmetic circuit 57 and a terminal CP of the flip-flop circuit FF. Therefore, the flip-flop circuit FF is set, and the standby state of the μ-COM arithmetic circuit 57 is released, as shown in FIG. 18B. The set output, provided at the terminal of the flip-flop circuit FF, is delayed for a predetermined period of time (in FIG. 18C) by a delay circuit composed of a resistor $R_{SB}$ and a capacitor $C_{SB}$.

Therefore, the clock signal generator circuit 56 starts its operation after the delay time (see FIG. 18C).

When the clock signal generator circuit 56 starts its operation, the μ-COM arithmetic circuit 57 also starts its operation, as indicated in FIG. 18D; that is, it performs a predetermined operation according to a command from the central processing device $M_1$. When the predetermined operation has been accomplished, the μ-COM arithmetic circuit 57 applies a signal through the terminal $PO_4$ to the flip-flop circuit FF to reset the circuit FF (indicated at $R_e$ in FIGS. 18B–18D). Upon reception of the reset signal from the terminal $\overline{Q}$ of the flip-flop circuit FF, the operational mode of the μ-COM arithmetic circuit 57 is changed to the standby mode. However, since the delay circuit is connected between the flip-flop circuit FF and the clock signal generator circuit 56, the operations of the clock signal generator circuit 56 and the μ-COM arithmetic circuit 57 are not immediately stopped; that is, they continue for a predetermined period of time. In other words, the μ-COM arithmetic circuit 57 stops its operation after predetermined period of time t which is required for the μ-COM arithmetic circuit 57 to operate in the standby mode after it has accomplished the predetermined operation.

The single operation with the central processing device connected to one measuring unit (a ratio of 1:1) is as described above. Now, a parallel operation with the central processing device connected to a plurality of measuring units will be described. In the system, the central processing device $M_1$ is connected to a plurality of measuring units $ME_1$ through $ME_n$. Therefore, the central processing device $M_1$ transmits start data common to all the measuring units and address data assigned to a designated measuring unit so that the designated measuring unit is selected and data is transmitted between the designated measuring unit and the central processing device $M_1$.

The intermittent driving method when a plurality of measuring units are operated in a parallel mode will be described with reference to FIGS. 19A–19C, which taken together, are a timing chart describing the intermittent operation in the parallel operation. All the measuring units are started by start data (ST indicated in FIG. 19A) from the central processing device $M_1$ to release their standby states, and in a predetermined period of time, the clock signal generator circuits are started. This operation is common to all the measuring units. Some of the measuring units are addressed (FIG. 19B), while the remaining measuring units are not (FIG. 19C). Therefore, the former are placed in the standby state after performing the designated processing operations, at $H_1$ in FIG. 19B, while the latter are placed in the standby state after a predetermined period of time, at $H_2$ in FIG. 19C. That is, unneeded operations are eliminated as much as possible, as a result of which power consumption is reduced.

Next, control loop formation in the field carried out according to the invention will be described. The field devices are called by a polling selecting system under the control of the master processor $M_1$. All the field devices are started by the start bit from the master processor $M_1$ addressed stop their operations after a predetermined period of time.

It is assumed that the measuring unit $ME_1$ is selected. In this case, the measuring unit $ME_1$ transmits measurement data through the optical fiber $OF_2$ to the optical distributor SC. Accordingly, the measurement data is transmitted to the master processor $M_1$, the other field devices and the submaster processor SM from the optical distributor SC. The measuring units $ME_1$, $ME_2$, . . . and $ME_n$ are provided with the field controllers $CT_1$, $CT_2$, . . . and $CT_n$, respectively. Therefore, in the field, the field controller $CT_1$ is selected by the output signal of the measuring unit $ME_1$. In the field controller $CT_1$, the output signal (measurement data) of the measuring unit $ME_1$ is stored in the memory. The control operation may be started simultaneously when the measurement data is inputted. However, since the field devices are called sequentially by the master processor $M_1$, a method may be employed in which, when the field controller $CT_1$ is called by the master processor $M_1$, the amount of operation W is calculated using the measurement data stored in the memory, as described with reference to FIG. 13, and the amount of operation thus calculated is applied to the operating terminal OP (the electropneumatic positioner $OP_1$) and is stored in the memory gain so that it can be transmitted to the master processor $M_1$ later. As the output signal (measurement data) from the measuring unit (ME) is applied through the optical distributor SC directly to the field controller (CT), the control loop of the field controller (CT) is formed in the field. The output signal of the measuring unit (ME) is applied to the master processor $M_1$ also on the panel side, and is utilized only for controlling and monitoring the field from the panel side.

The operation of the submaster processor SM will now be described. The polling signal of the master processor $M_1$ is applied through the optical distributor SC to all the field devices and the submaster processor SM. The submaster processor SM monitors the polling signal from the master processor $M_1$, and when the polling signal is not provided for a certain period of time, the submaster processor SM assumes the occurrence of a fault in the master processor $M_1$ and replaces the master processor with itself. That is, the submaster processor SM performs the polling of the field devices. The data which the submaster processor SM has obtained from the field devices is stored in the memory 72; however, it is transferred into the master processor $M_1$ after the latter $M_1$ has been rendered operational.

As described above, the submaster processor SM can take the place of the master processor $M_1$. Therefore, the field device may be controlled by only the submaster processor SM on the side of the field, that is, without the master processor $M_1$.

In the embodiment of FIG. 1, the master processor (central processing device) $M_1$ is connected through one bidirectional optical transmission path $OF_1$ to the optical relay SC. However, the following method may be employed: Two optical transmission paths are provided between the central processing device $M_1$ and the optical relay SC, while two pairs of light-emitting elements and light-receiving elements are provided for the central processing device $M_1$. The light-emitting elements thus provided are alternately operated so that return data from the field devices is received through the optical relay SC and the optical transmission paths by the light-receiving elements in the central processing device $M_1$. In this case, the optical transmission paths are substantially protected from damage and the system is improved in reliability.

As is apparent from the above description, in accordance with the invention, N field devices are coupled through an optical distributor which can perform optical branching and coupling in the ratio of N:N, whereby optical transmission is carried out in the ratio of N:N. The host processing device (master processor) is supplied mainly with controlling and monitoring data, and the field controllers which control the operating terminals are controlled through the optical relay by the measuring devices on the side of the field. Accordingly, the system of the invention is greatly rationalized and simplified, and thus improved in reliability compared with the conventional system.

The field devices are powered by built-in batteries, which may be solar batteries. That is, the system can be powered by various different power sources. Accordingly, if the higher system (the system on the side of the panel) malfunctions, the lower system (the system on the side of the field) is not affected thereby. As described above, when the higher system malfunctions, the submaster processor can take the place of the master processor, thus further improving the reliability of the system.

Furthermore, according to the invention, the accuracy of measurement is improved by digitizing the measuring units. The measuring units are coupled through optical transmission paths with the higher processing device, and optical transmission is carried out through the optical transmission paths. Accordingly, transmission is not affected by noise, thus resulting in high reliability. As the measuring units are coupled through the N:N star coupler to the higher processing device, the number of transmission paths, or the length of each transmission path, can be reduced. Thus, the field instrumentation system of the invention is considerably economical. Furthermore, the system is advantageous in that even when a measuring unit becomes faulty, the difficulty will not affect other units. On this point, the system of the invention is different from the conventional one in which the measuring units are cascade-connected.

We claim:

1. A field instrumentation system having a panel side and a field side remote from the panel side and comprising: field devices arranged on the field side and comprising digital measuring units, including microcomputers, and field controllers for controlling operating terminals, said field devices digitally processing data and performing bidirectional optical transmission of digital signals in a predetermined sequence;

an optical distributor arranged on the field side of said field instrumentation system and connected to respective ones of said field devices through an optical transmission path; and a master processor, arranged on the panel side of said field instrumentation system and connected through an optical transmission path to said optical distributor for controlling said field devices, said optical distributor being arranged so that optical data on an optical transmission path coupled to said optical distributor is transmitted through said optical distributor to all other optical transmission paths connected to said optical distributor, output signals of said digital measuring units being applied through said optical distributor directly to said field controllers on said field side and also are applied separately, through said optical distributor, to said master processor, wherein a control loop is formed for said field controllers on said field side.

2. The system as claimed in claim 1, further comprising built-in batteries for powering said field devices.

3. The system as claimed in claim 1, wherein said master processor on the panel side is connected through two optical transmission paths to said optical distributor on the field side for redundant signal transmission.

4. The system as claimed in claim 1, wherein said field controllers comprise means, operating in response to instructions from said master processor, for remotely setting predetermined control operating parameters.

5. The system as claimed in claim 1, wherein said field controllers comprises means, operating in response to instructions from said master processor, for applying signals representing amounts of operation to said operating terminals.

6. A field instrumentation system having a panel side and a field side remote from the panel side and comprising:

field devices arranged on the field side and comprising digital measuring units, including microcomputers, and field controllers for controlling operating terminals, said field devices digitally processing data and performing bidirectional optical transmission of digital signals in a predetermined sequence;

an optical distributor arranged on the field side of said field instrumentation system and connected to respective ones of said field devices through a bidirectional transmission path; and a submaster processor arranged on the field side and connected through an optical transmission path to said optical distributor for controlling said field devices, said optical distributor being arranged so that optical data on an optical transmission path coupled to said optical data on an optical transmission path coupled to said optical distributor is transmitted through said optical distributor to all other optical transmission paths connected to said optical distributor, output signals of said digital measuring units being applied through said optical distributor directly to said field controllers on said field side and also are applied separately, through said optical distributor, to said submaster processor, wherein a control loop is formed for said field controllers on said field side.

7. The system as claimed in claim 6, further comprising built-in batteries for powering said field devices and said submaster processor.

8. A field instrumentation system having a panel side and a field side remote from the panel side comprising:

field devices arranged on the field side and comprising digital measuring units, including microcomputers, and field controllers for controlling operating terminals, said field devices digitally processing data and performing bidirectional optical transmission of digital signals in a predetermined sequence;

an optical distributor arranged on the field side of said field instrumentation system and connected to respective ones of said field devices through an optical transmission path;

a master processor arranged on the panel side of said field instrumentation system and connected through an optical transmission path to said optical distributor, for controlling said field devices; and a submaster processor, arranged on the field side of said field instrumentation system and connected through an optical transmission path to said optical distributor, for controlling said field devices, said optical distributor being arranged so that optical data on an optical transmission path coupled to said optical distributor is transmitted through said optical distributor to all other optical transmission paths connected to said optical distributor, output signals of said digital measuring unit being applied through said optical distributor directly to said field controllers and also are applied separately through said optical distributor, to said master processor and said submaster processor, wherein a control loop for said field controllers is formed on said field side, and when said master processor becomes faulty, said submaster processor automatically takes the place of said master processor.

9. The system as claimed in claim 8, further comprising built-in batteries for powering said field devices and said submaster processor.

10. The system as claimed in claim 8, wherein said master processor on the panel side is connected through two optical transmission paths to said optical distributor on the field side for redundant signal transmission.

11. The system as claimed in claim 8, wherein said field controllers comprise means, operating in response to instructions from said master processor, for remotely setting predetermined control operating parameters.

12. The system as claimed in claim 8, wherein said field controllers comprise means, operating in response to instructions from said master processor, for applying signals representing amounts of operation to said operating terminals.

13. The system as claimed in claim 8, wherein said master processor comprises means for continuously applying a polling signal through said optical distributor to said field devices, wherein when application of said polling signal is suspended for a predetermined period of time, said submaster processor automatically takes the place of said master processor.

* * * * *